INVENTORS.
MAURICE R. BURNELL
OTTO HAUNOLD

BY THEIR ATTORNEYS.
HARRIS, KIECH, RUSSELL & KERN

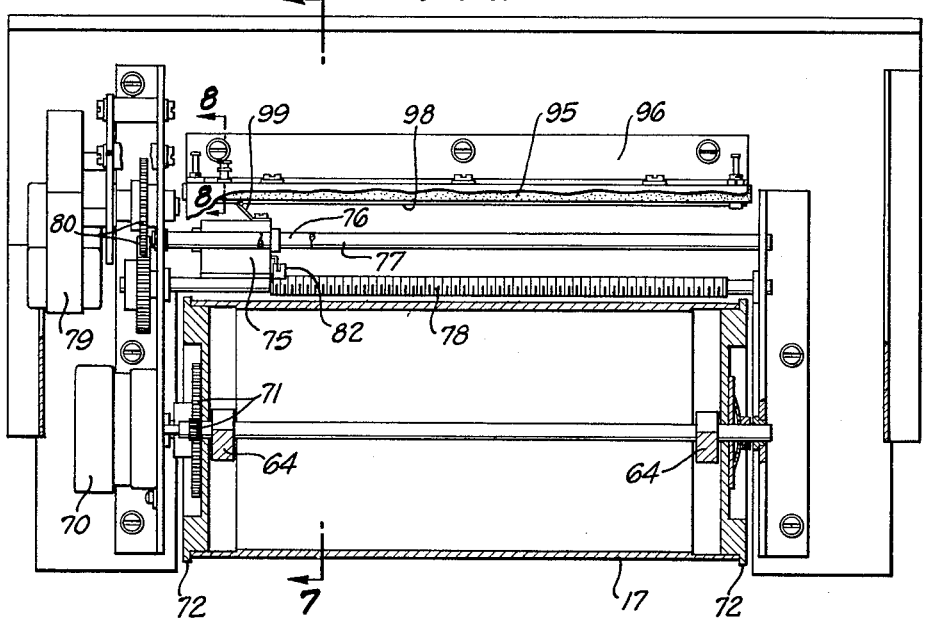
FIG. 6.
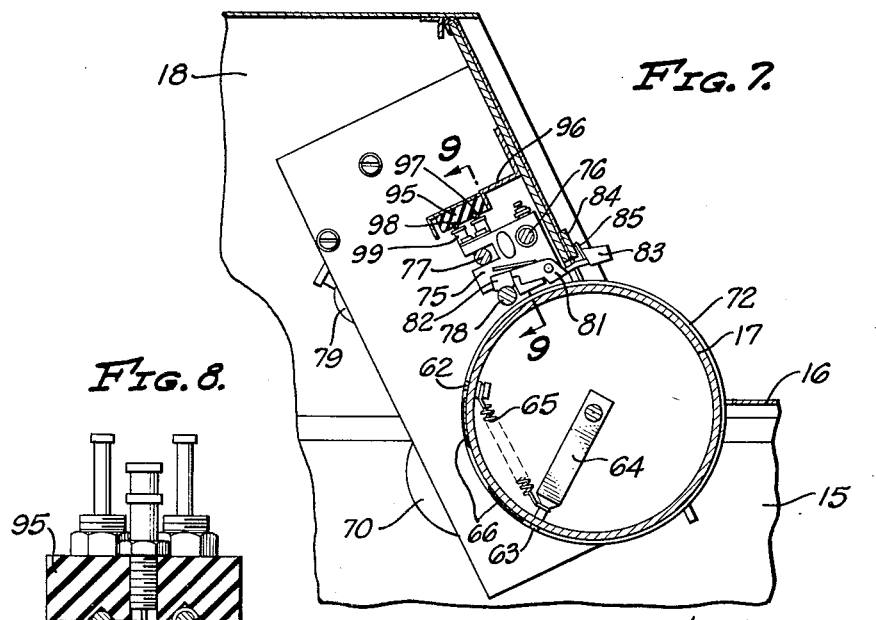
FIG. 7.
FIG. 8.
INVENTORS.
MAURICE R. BURNELL
OTTO HAUNOLD
BY THEIR ATTORNEYS.
HARRIS, KIECH, RUSSELL & KERN Jan. 5, 1965   M. R. BURNELL ETAL   3,164,005
GAS CHROMATOGRAPH
Filed April 3, 1961   5 Sheets-Sheet 4
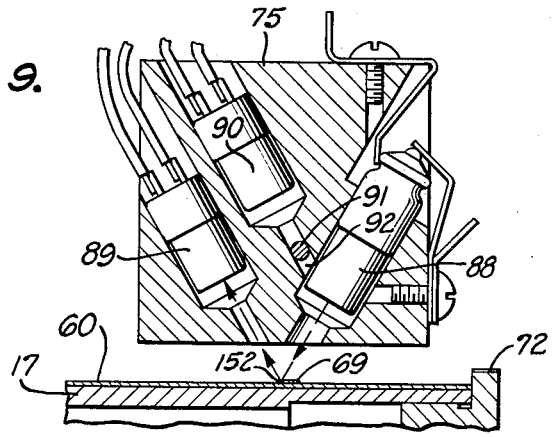
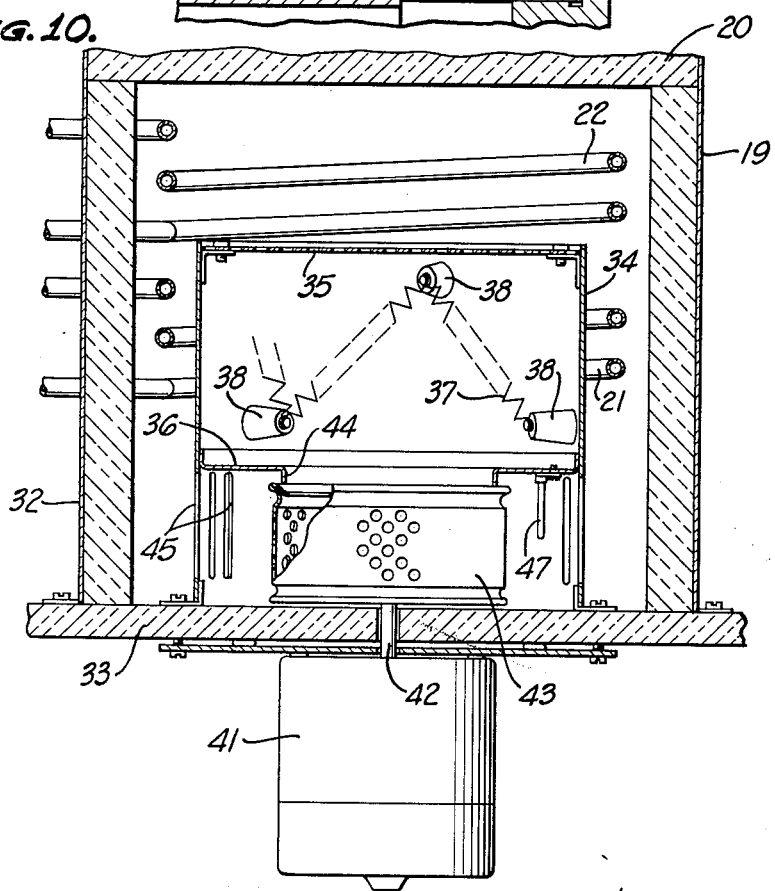
INVENTORS.
MAURICE R. BURNELL
OTTO HAUNOLD
BY THEIR ATTORNEYS.
HARRIS, KIECH, RUSSELL & KERN

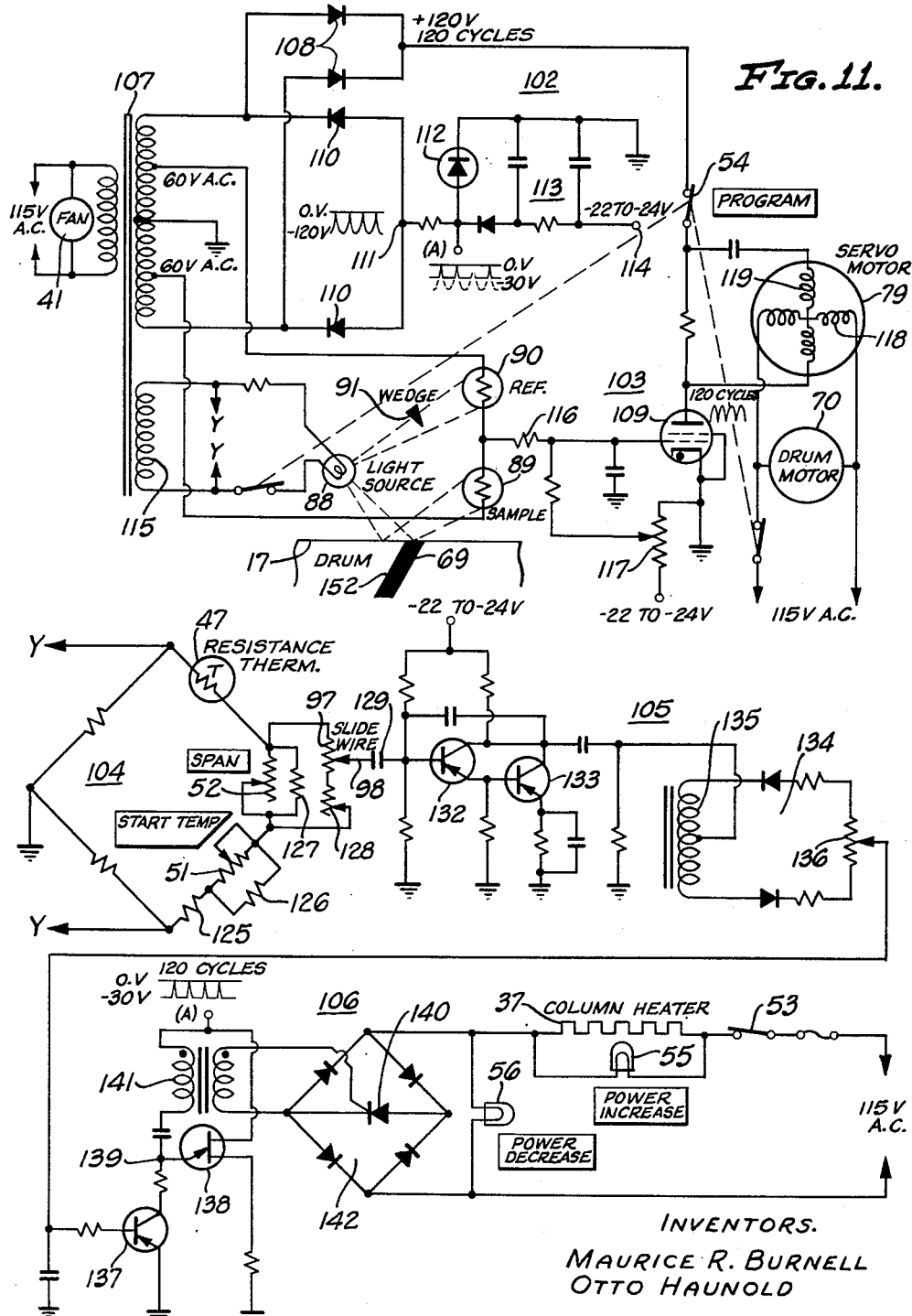

United States Patent Office 3,164,005
Patented Jan. 5, 1965

3,164,005
GAS CHROMATOGRAPH
Maurice R. Burnell, Fullerton, and Otto Haunold, Whittier, Calif., assignors to Beckman Instruments, Inc., a corporation of California
Filed Apr. 3, 1961, Ser. No. 100,396
3 Claims. (Cl. 73—23.1)

This invention relates to gas chromatographs and temperature controls therefor and, in particular, to gas chromatographs with temperature programs.

It has been found that the sensitivity of gas chromatograph measurements can be increased and that the time required for analysis can be decreased by varying the column temperature during a sample run. While a linear or continuous rate of change of temperature is of great value, it has also been found that even better results may be obtained in many instances by using nonlinear temperature programs and by using different programs with the same sample, depending on the particular constituents of the sample which are of interest.

Accordingly, it is an object of the invention to provide a new gas chromatograph having a programmed temperature control for the column. A further object is to provide such an instrument in which the temperature may be continuously varied according to a predetermined function during the sample run. Another object is to provide such an instrument in which the temperature program may be linear or nonlinear and in which the temperature program may be changed or adjusted between runs. A still further object is to provide such an instrument in which a plurality of similar or different programs may be preset and any one selected at will for a sample run.

It is an object of the invention to provide a gas chromatograph incorporating a temperature program system in combination with a proportional heating system for controlling the column temperature throughout a sample run while obtaining maximum base line stability during the run. A further object is to provide a column temperature control in which the magnitude of the heat applied to the column is proportional to the deviation of the actual column temperature from the predetermined desired temperature. Another object is to provide such a system having very low heat mass and a very high rate of heat change permitting highly nonlinear temperature programs to be executed. A particular object is to provide such an instrument in which a particular temperature program may be set and then used in conjunction with various absolute temperatures and various temperature spans without requiring resetting of the program.

It is an object of the invention to provide a new and improved gas chromatograph including a chromatographic column, an inlet line with a carrier gas inlet and a sample inlet coupled thereto, an outlet line coupled to a detector, a heat insulated enclosure, means for supporting the column within the enclosure, a variable heat source positioned within the enclosure, and control means for controlling the heat source to vary the temperature within the enclosure as a predetermined function of time. A further object is to provide such an instrument in which the column and the heat source are suspended within the enclosure out of contact with the enclosure to provide a very low heat mass for the instrument. Another object is to provide such an instrument including two columns supported within the enclosure with one of the columns functioning as the sample column and the other as a reference column to provide gas streams of equal temperature for the detection system. It is an object of the invention to provide such an instrument including a program carrier having a continuous temperature indicating edge thereon, means for moving the carrier past a follower zone, means for generating a temperature set point including an edge follower positioned at the follower zone for following the indicating edge as it moves past the zone, means for determining the temperature within the enclosure, and control means actuated by the difference between the temperature set point and the enclosure temperature for controlling the energy coupled to the heat source. A particular object is to provide such an instrument including a strip of tape or the like which is movably fixed to the program carrier for defining the temperature indicating edge. A further object is to provide such an instrument incorporating a light source and photocell to provide a servo system input signal for driving the photocell along the edge as the program carrier moves. Another particular object of the invention is to provide such an instrument in which the temperature set point generator, ordinarily a resistor wiper, and the photocell are moved as a unit to eliminate the effects of noise in the servo system from the temperature signal.

It is a particular object of the invention to provide such a gas chromatograph in which the program carrier is a drum which is driven in rotation as a function of time to provide the temperature program signal. A further object is to provide such an instrument in which the adjustable tape defining the temperature indicating edge is affixed to a sheet which in turn is wrapped onto the drum, permitting substitution of a large number of programs as desired.

It is an object of the invention to provide a new process for controlling the temperature of a gas chromatograph.

The invention also comprises novel details of construction and novel combinations and arrangements of parts, which will more fully appear in the course of the following description.

The drawings merely show and the description merely describes preferred embodiments of the present invention which are given by way of illustration or example.

In the drawings:

FIG. 6 is a sectional view taken along the line 6—6 of FIG. 1;

FIG. 7 is a partial sectional view taken along the line 7—7 of FIG. 6;

FIG. 8 is an enlarged sectional view taken along the line 8—8 of FIG. 6;

FIG. 9 is an enlarged sectional view taken along the line 9—9 of FIG. 7;

FIG. 10 is an enlarged sectional view taken along the line 10—10 of FIG. 1; and

FIG. 11 is an electrical schematic of the instrument of FIG. 1.

Figure 1:
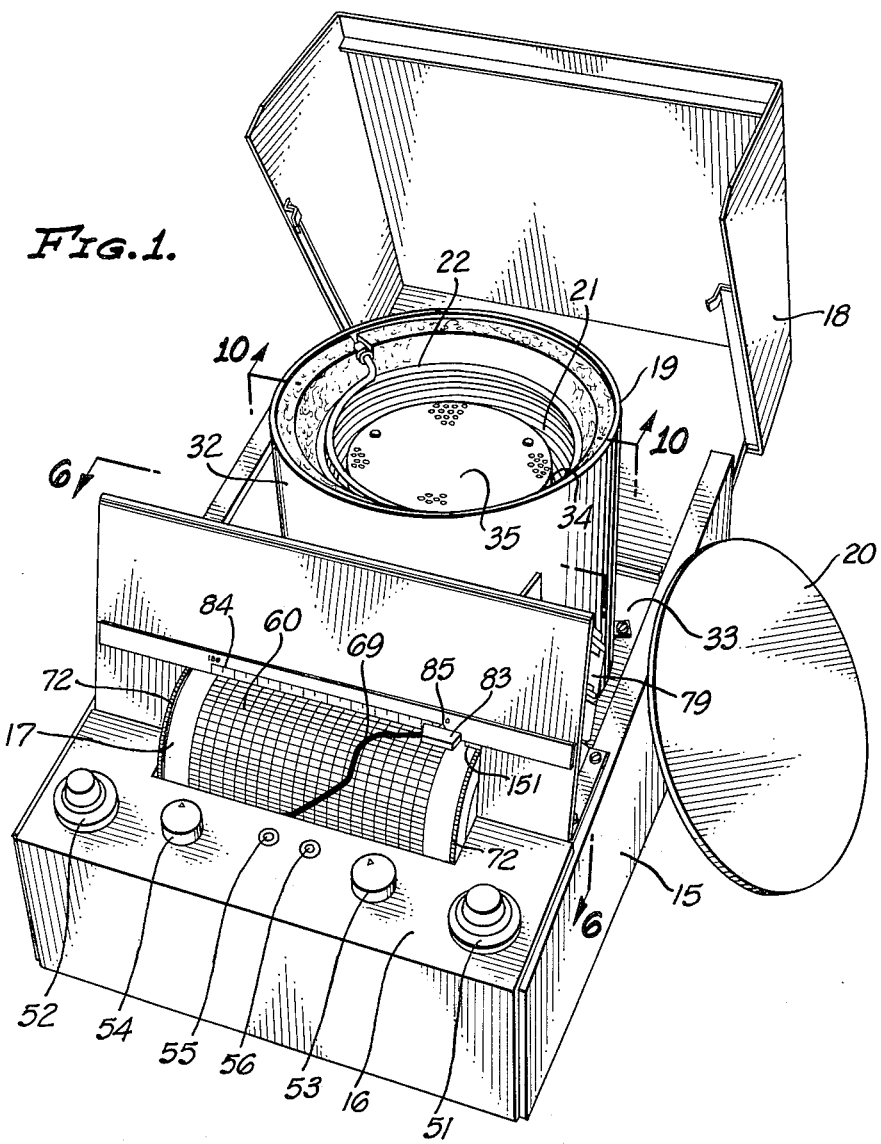
FIG. 1 is an isometric view of a preferred embodiment of the invention showing the cover raised and the oven lid removed.
Figure 2:
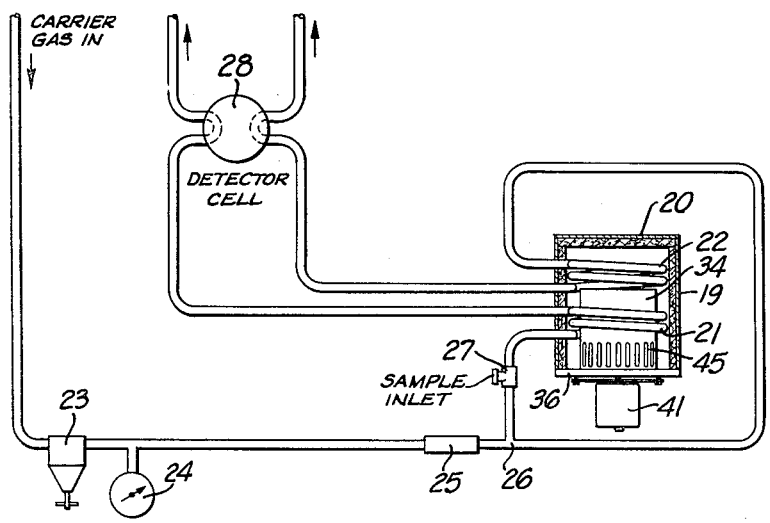
FIG. 2 is a gas flow diagram of the instrument of FIG. 1.

The instrument as shown in FIG. 1 includes a housing 15, a control panel 16, a program carrier drum 17, a hinged cover 18, and a column enclosure 19, with the hinged cover raised and a lid 20 of the enclosure 19 removed. The gas flow path of the instrument is shown in FIG. 2 and includes a sample column 21 and a reference column 22 positioned within the enclosure 19. The carrier gas flows in through a pressure regulator 23, past a pressure gauge 24, and through a flow restrictor 25 to a T junction 26. The gas flow divides at the T with a portion flowing through a sample inlet 27, the sample column 21, and the sample side of a thermal conductivity detector 28. The other portion of the carrier gas flows through the reference column 22 and the reference side of the detector cell 28. The columns, the detector cell and the associated components may be conventional in nature and will not be described in detail herein.

The column enclosure is shown in greater detail in FIG. 10 and includes a cylindrical housing 32 with a permanent bottom 33 and removable lid 20. The walls of the housing are lined with a thermal insulating material to substantially reduce heat transfer with the surrounding atmosphere. An upright tube 34 is supported within the enclosure on the bottom 33. A perforated plate 35 is carried at the top of the tube 34 to provide protection for the interior thereof. A baffle plate 36 is positioned horizontally within the tube between the top and bottom.

A heat source in the form of an electrical resistance heater 37 is supported around the periphery of the tube 34 on insulating plugs 38 between the plate 35 and baffle 36.

The column 21 is in coiled form and is supported from the wall of the housing 32 about the tube 34. The coil 22 has a similar configuration and is supported from the wall of the housing above the coil 21. An electric motor 41 is carried from the bottom 33 of the enclosure, with a shaft 42 projecting upward into the tube 34. A fan or blower wheel 43 is positioned in the tube 34 below the baffle 36 and is driven from the shaft 42 to provide continuous air circulation through the enclosure. Air flows downward through the plate 35 past the heater 37 and through the opening 44 of the baffle. The air is forced outward through slots 45 by the blower wheel for flow upward past the columns and then downward into the tube. Means is provided for determining the temperature within the enclosure. Typically a temperature sensitive resistor 47 may be carried on the baffle 46 to extend into the air stream leaving the blower wheel 43.

Referring again to FIG. 1, the control panel 16 includes a dial 51 for setting the starting temperature, another dial 52 for setting the temperature span, a switch 53 for turning the instrument on, another switch 54 for initiating a programmed run, and indicator lights 55, 56. The functions of these controls will be described in greater detail in conjunction with the schematic of FIG. 11.

Figure 3:
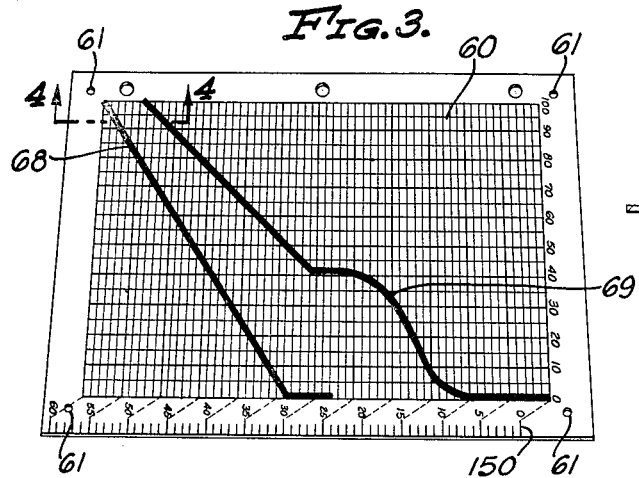
FIG. 3 is a view of a preferred form of the temperature program chart.
Figure 4:
FIG. 4 is an enlarged partial sectional view taken along the line 4—4 of FIG. 3.

The preferred form of program carrier illustrated herein incorporates the drum 17 and means for positioning a chart 60 thereon. A typical chart is shown in FIG. 3 and may be a sheet of paper or plastic having openings 61 at each corner thereof for positioning over mating pins 62, 63 projecting from the outer surface of the drum 17 (FIG. 7). The pins 63 are carried on pivoted arms 64 which are connected to the fixed pins 62 by tension springs 65 to maintain the chart in position on the drum. The ends of the chart preferably are positioned under an overlying plate 66 carried on the drum surface.

The chart 60 may be blank but preferably is laid out with arbitrary divisions, such as zero to one hundred, along the axis of the drum and with time divisions, such as zero through sixty minutes, along the periphery of the drum. A temperature indicating edge is carried on the chart. This edge may be in the form of a continuous line marked on the chart but preferably is a strip of tape 68 adhered to the surface of the chart. The strip of tape may have any contour, such as the linear strip 68 or the strip 69 having a nonlinear portion and a linear portion. Two or more strips may be provided on a single chart with each strip having any desired contour. The strips are easily removed from the chart and replaced to change the contour at will. For applications where a specific temperature program will be used for an extended period of time, it may be desirable to provide a plurality of charts each having a permanent line inked or printed thereon.

The drum 17 may be driven at any rate and at any predetermined function, but ordinarily is operated at a constant rotational velocity with respect to time by a synchronous motor 70 through a gear train 71 (FIG. 6). The gear train is coupled to the drum through a friction clutch, such as a pair of cork-faced plates, permitting manual adjustment of the drum position. The edges 72 of the drum are knurled and project above the control panel providing easy positioning of the drum.

The instrument includes an edge follower servo which follows the edge of the strip on the chart as the drum rotates to provide a temperature set point for the temperature control system. In the preferred embodiment illustrated herein, a follower block 75 is carried on guide rods 76, 77 for translation along a line parallel to the axis of rotation of the drum 17 (FIGS. 6 and 7). A lead screw 78 is positioned parallel to the guide rods 76, 77 and is driven from a servo motor 79 through a gear train 80. A bracket 81 is pivotally mounted on the block 75 and carries a gear segment 82 for engaging the lead screw 78. The bracket is spring loaded for engagement with the lead screw but may be disengaged by manually depressing the bar 83, permitting manual translation of the block 75 along the guide rods. A scale 84 is affixed to the housing above the drum (FIG. 1) with the scale 84 preferably corresponding to the axial scale on the chart 60 so that pointer 85 on the bar 83 accurately indicates the position of the block with respect to the chart.

A lamp 88 and photocells 89, 90 are carried in the block 75 (FIG. 9). The lamp 88 is positioned for directing a beam of light onto the surface of the drum 17 and the photocell 89 is positioned for receiving light from the lamp 88 reflected from the drum surface. The lamp 90 is positioned within the block for receiving light from the lamp 88 directly. A screw 91 is threadedly carried in the block 75 for positioning in a light passage 92 between the lamp 88 and the cell 90 to provide an adjustment of the light intensity falling on the cell 90.

The temperature set point is provided by a slide-wire resistor carried on the housing and a resistor slider carried on the block 75. The slide-wire resistor includes an insulating block 95 carried on a bracket 96 affixed to the housing. A wire-wound resistor 97 and a conductor 98 are mounted in the block 95 parallel to each other and to the direction of travel of the follower block 75. A U-shaped spring contact 99 is carried on the block 75 to provide a bridging circuit between the resistor 97 and the conductor 98 so that the ends of the resistor 97 correspond to the ends of a potentiometer and the conductor 98 corresponds to the arm of the potentiometer.

We turn now to the schematic of FIG. 11 which includes a power supply section 102, a servo amplifier section 103, a temperature signal section 104, a heater amplifier section 105, and a power amplifier section 106. The power supply section 102 includes a power transformer 107 having its primary energized from a 115 volt A.C. source which also drives the fan motor 41. A pair of rectifiers 108 provides a 120 volt, 120 cycle per second source for the plate of a gas tube 109. Another pair of rectifiers 110 provides a 120 volt, 120 cycle per second voltage at point 111 which is clipped by a Zener clipper 112 to provide a pulsating voltage at point A. This pulsating voltage is smoothed through a filter 113 to provide a negative D.C. voltage at point 114.

Another winding 115 on the transformer 107 energizes the lamp 88 and also the temperature signal section 104 at points Y—Y.

In the servo amplifier section 103, the photocells 89, 90 are connected in series across an A.C. source from the transformer 107. The junction point of the two cells is connected to the control grid of the gas tube 109 through a resistor 116. A potentiometer 117 provides a control of the bias of the gas tube. The servo motor 79 is a two-winding, bidirectional motor with one winding 118 continuously energized from an A.C. source and the other winding 119 connected in the plate load of the gas tube 109. The drum motor 70 is energized from the same source as the servo motor winding 118.

The temperature signal section 104 includes an A.C. bridge energized at the points Y—Y and having the temperature sensitive resistor 47 in one arm thereof. The starting temperature control in the form of a variable resistor 51 is connected in an adjacent arm in series with a resistor 125. A resistor 126 is connected in parallel with the variable resistor 51. The temperature span control in the form of a variable resistor 52 is connected between the arms of the bridge circuit, with a resistor 127 connected in parallel with the variable resistor 52. The slide-wire resistor 97 is connected in series with a variable resistor 128 with the series combination connected in parallel with the temperature span resistor 52. The arm 98 of the slide-wire resistor provides the input signal to the amplifier section 105 through a coupling capacitor 129. The resistors 126 and 127 are selected to provide a precise and predetermined value for the resistors 51, 52 respectively. The variable resistor 128 is initially adjusted to bring the arm 98 to the zero point on the scale with the starting temperature resistor 51 adjusted to the minimum starting temperature and thereafter does not require adjustment.

The amplifier section 105 includes a two-stage A.C. amplifier employing transistors 132, 133 and a half-wave demodulator 134 having a reference voltage supplied from a winding 135 of the transformer 107. The output of the demodulator is coupled through a balance control 136 and an amplifier stage 137 to a unijunction 138. The unijunction is energized from the pulse power source at point A and develops a pulse output at a time which is a function of the D.C. level at point 139. The output from the unijunction circuit is coupled to a silicon controlled rectifier 140 through a pulse transformer 141. The silicon controlled rectifier 140 provides the control fo a full-wave bridge 142 which is connected in series with the column heater 37 across the A.C. power source. The indicator lamp 55 is connected in parallel with the column heater 37 and the indicator lamp 56 is connected in parallel with the full-wave bridge 142.

Prior to making an analysis on the gas chromatigraph, the instrument is set up in the following manner. A particular temperature program is decided upon and a strip with the appropriate contour is affixed to the chart and the chart is placed in position on the drum. The drum is rotated manually to bring the zero point of the strip under the photocell of the follower block, which corresponds to bringing the zero line 150 (FIG. 3) in line with the indicator 151 (FIG. 1). The bar 83 of the follower block is depressed and the follower block is manually traversed to bring the pointer 85 to the zero position on the scale 84. The starting temperature is set by the dial and resistor 51 and the temperature span is set by the dial and resistor 52. For example, it may be desired to start the sample run with the column temperature at 100° C. and end the run with the temperature at 200° C. Then the dial 51 would be set for a 100° C. start and the dial 52 for a 100° C. span. For this example, the markings on the scale 84 would be read directly in degrees. For other magnitudes of span, the scale 84 would require an appropriate multiplier.

The heater power switch 53 is turned on. If the column temperature, as indicated by the temperature sensitive resistor 47, is not at the desired starting temperature, the column heater 37 will be energized to raise the temperature of the column. When the column temperature reaches the desired point, the current through the heater will be reduced to just maintain the desired temperature. The heater control circuitry 104, 105, 106 provides for proportional control of the current to the heater 37, with the magnitude of current in the heater being proportional to the deviation of the indicated temperature from the desired temperature. With this circuitry, the heater is continuously energized rather than being intermittently on and off, and the changes in heater energization are smooth rather than stepwise, providing more accurate control of column temperature and reducing short term swings in column temperature and apparent base line shifts. The lamp 55 is illuminated when relatively high power is being fed to the heater to effect a change in column temperature. The lamp 56 is illuminated when relatively little power is being used in the heater and indicates that the desired temperature obtains.

When the desired starting temperature is achieved, a sample may be introduced in the conventional manner and the program switch 54 turned to the on condition. The drum motor 70 immediately starts, initiating the temperature program. As the drum rotates, the strip 69 tends to move away from the spot of light directed onto the drum by the lamp 88, producing an unbalance in the impedance of the photocells 89, 90 and hence an input signal to control grid of the tube 109. The magnitude and phase of the A.C. signal appearing at the control grid controls the firing of the tube and thereby the magnitude and phase of the current through the winding 119 of the servo motor. The servo motor 79 drives the lead screw 78 to move the follower block along the drum and maintain the spot of light from the light source at the edge 152 of the strip 69. The servo system will keep the follower block so positioned along the edge as the drum continues to rotate. This servo system is a simple closed loop system utilizing two photocells to produce an unbalance signal which is amplified in a single gas tube amplifier stage for driving a two-phase servo motor, with the servo motor mechanically positioning the photocells to restore the balance. A fixed resistor could be used in place of the reference photocell 90, however, the present arrangement eliminates adverse effects due to temperature and variations in the power supply voltage, permitting the light source, the balancing circuit and the amplifier circuit to be operated from an unregulated A.C. supply.

Movement of the follower block 75 by the servo motor 79 also effectively moves the arm 98 relative to the slide-wire resistor 97 producing a temperature error signal input to the amplifier section 105. This A.C. error signal is amplified and demodulated to provide a D.C. control for the unijunction circuit which in turn controls the rectifier bridge through the rectifier 140 to increase the current to the heater 37.

Ordinarily, at the end of a sample run the program switch is turned off and the follower block is manually returned to the starting point. It is necessary to wait until the column temperature has been lowered to the starting temperature before another sample can be injected. The cooling period can be shortened by introducing cooler air into the enclosure 19, as by removing the lid 20 or opening a vent or the like.

Figure 5:
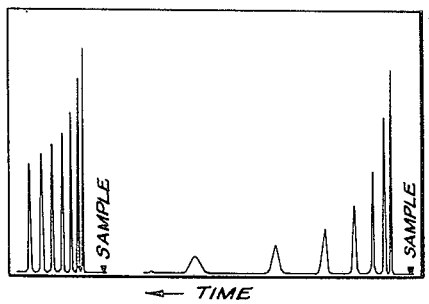
FIG. 5 is a graph showing the results of two chromatograph runs with the same sample using an isothermal run and a linear temperature programmed run.

The right-hand curve of FIG. 5 shows an isothermal temperature run on $C_5$–$C_{11}$ normal paraffins with the column operated at a temperature of 160° C. The curve on the left of FIG. 5 shows a programmed temperature run on the same sample and instrument with the temperature starting at 160° C. and increasing at a rate of 24° C. per minute. The time scale is the same for both runs. It is seen that the use of a linear temperature program materially shortens the time for analysis and substantially increases the sharpness of the component peaks. A non-linear temperature program would permit additional control of the spacing between peaks and of the relative magnitudes of peaks, providing an elegant tool for analysis of particular portions of a sample.

The column heating system of the gas chromatograph described herein comprises a very low mass system with a high rate of heat addition and permits operation with a temperature increase rate of 40° C. per minute and higher. The blower provides for complete circulation of the air in the enclosure twice per second. This system provides a continuously variable temperature with the change in temperature being proportional to the temperature error. While the preferred embodiment described herein utilizes a sample column and a reference column, it should be noted that the reference column is not essential and can be omitted in applications where the temperatures used do not produce significant errors and where the detector system is not affected by temperature variations. The invention has been decribed herein in conjunction with a system for increasing the temperature of the column during a sample run since substantially all chromatograph applications will call for a temperature increase. Of course, the control system is equally applicable for cooling the column with a heat sink being substituted for or used in combination with the heat source.

The temperature section 104 permits operation of the chromatograph as an isothermal instrument with the program switch 54 in the off condition, the temperature starting control 51 being used to set the particular temperature desired. With the temperature programmer in operation, any starting temperature within the operating range of the instrument may be selected and any span from as little as a fraction of a degree to the maximum, in this embodiment 300° C., may be utilized. Variations in the temperature program are unlimited, as the servo system will follow any contour edge on the drum and the temperature rate of change of the heating system is sufficiently high to substantially eliminate any time lag.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a gas chromatograph having a chromatographic column, an inlet line with a carrier gas inlet and a sample inlet coupled thereto, and an outlet line coupled to a detector, the combination of:
   a heat insulated enclosure;
   means for supporting the column within said enclosure;
   a variable heat source positioned within said enclosure;
   a program carrier drum having a continuous temperature indicating edge thereon;
   means for rotating said drum;
   an edge follower servo for generating a first electrical signal as a function of a desired temperature set point for said enclosure, said servo including a photocell positioned adjacent the surface of said drum, means for translating said photocell for following said indicating edge as the drum rotates, and a potentiometer having a slider movable with said photocell, with the position of said slider determining the volume of said first electrical signal corresponding to the desired temperature set point;
   means for generating a second electrical signal as a function of the temperature within said enclosure, said second electrical signal generating means including a temperature sensitive resistor connected as one arm of a bridge circuit, with the bridge circuit having a second resistor in the adjacent arm, a third resistor connected between said temperature sensitive resistor and said second resistor, and a fourth resistor connected in parallel with said third resistor, with said potentiometer slider of said edge follower servo traversing said fourth resistor to provide the variable temperature set point, and with said second resistor being variable to set the initial temperature independent of said indicating edge, and with said third resistor being variable to said magnitude of change of said first electrical signal produced by said servo as it follows said edge; and
   control means responsive to the difference between said first electrical signal corresponding to said temperature set point and said second electrical signal corresponding to said actual enclosure temperature for controlling the energy coupled to said heat source.

2. In a gas chromatograph having a chromatographic column, an inlet line with a carrier gas inlet and a sample inlet coupled thereto, and an outlet line coupled to a detector, the combination of:
   a heat insulated enclosure;
   means for supporting the column within said enclosure;
   a variable heat source positioned within said enclosure;
   a program carrier drum having a continuous temperature indicating edge thereon;
   means for rotating said drum;
   a potentiometer resistor supported contiguously to said drum substantially coextensive with the length thereof;
   an edge follower servo for generating a first electrical signal as a function of a desired temperature set point for said enclosure, said servo including a follower block, a photocell carried by said follower block and positioned adjacent the surface of said drum, a light source on said follower block directed toward said drum surface for reflection to said photocell, a slider attached to said block and movable therewith for traversing said potentiometer resistor so that the position of said slider determines the volume of said first electrical signal corresponding to the desired temperature set point;
   guide means for supporting said block for translation parallel to the axis of said drum;
   a lead screw positioned parallel to said guide means and driven by a servo motor;
   means carried on said follower block for resiliently engaging said lead screw for driving said block, with said block being manually disengageable for movement independently of said said servo motor;
   means for generating a second electrical signal as a function of the temperature within said enclosure; and
   control means responsive to the difference between said first electrical signal corresponding to said temperature set point and said second electrical signal corresponding to said actual enclosure temperature for controlling the energy coupled to said heat source.

3. An instrument as defined in claim 2 including a second photocell carried in said block and positioned to receive a constant proportion of direct radiation emitted from said light source and thereby serve as a reference cell, and means for connecting said cells in circuit to produce a servo motor drive signal which is a function of the difference between the radiation reaching the two cells.

References Cited in the file of this patent

UNITED STATES PATENTS

| 2,262,354 | Gates | Nov. 11, 1941 |
| 2,963,898 | Reynolds et al. | Dec. 13, 1960 |

OTHER REFERENCES

Article, Harrison et al. in book, Gas Chromatography, 1958, Amsterdam, Butterworth's Scientific Publications, London, pages 216–225.

Articles in Analytical Chemistry, vol. 31, No. 11, November 1959, by (1) Sullivan et al., pages 1826–1828, (2) Dal Nogare et al., pages 1829–1832.